United States Patent [19]

Meyer-Kahrweg

[11] 4,231,761
[45] Nov. 4, 1980

[54] FLARE GAS LIMITING APPARAUS FOR COAL GASIFICATION UNIT

[75] Inventor: Helmut Meyer-Kahrweg, Wuppertal, Fed. Rep. of Germany

[73] Assignee: Steag A.G., Essen, Fed. Rep. of Germany

[21] Appl. No.: 918,437

[22] Filed: Jun. 23, 1978

[30] Foreign Application Priority Data

Jun. 27, 1977 [DE] Fed. Rep. of Germany ....... 2728826

[51] Int. Cl.² .............................................. F17D 3/00
[52] U.S. Cl. ....................................... 48/192; 48/191; 48/87; 60/39.09 R; 60/39.12
[58] Field of Search ........................... 48/192, 191, 87; 60/39.12, 39.09 R, 39.13, 39.14, 39.82 P; 431/202

[56] References Cited

U.S. PATENT DOCUMENTS

| | | | |
|---|---|---|---|
| 2,059,411 | 11/1936 | Stubblefield et al. | 48/192 |
| 2,740,701 | 4/1956 | Tenney, Jr. | 48/61 |
| 3,849,662 | 11/1974 | Blaskowski et al. | 60/39.18 R |
| 3,866,411 | 2/1975 | Marion et al. | 60/39.12 |

*Primary Examiner*—Raymond N. Jones
*Assistant Examiner*—George C. Yeung
*Attorney, Agent, or Firm*—Remy J. VanOphem

[57] ABSTRACT

Apparatus for limiting fuel gas fed to the gas flare unit in a coal pressure gasification unit provided with a gas-steam turbine power plant connected thereto. Safety valves and a pressure orifice minimize atmospheric pollution.

5 Claims, 2 Drawing Figures

FLARE GAS LIMITING APPARAUS FOR COAL GASIFICATION UNIT

BACKGROUND OF THE INVENTION

I. Field of the Invention

This invention is an apparatus for limiting the quantity of fuel gas fed to a gas flare unit having a main flare and a start-up flare, from a coal pressure gasification unit with a gas steam turbine power plant connected thereto. The pressure gasification unit, charged with coal and connected by way of safety valves with the gas flare unit, is fed either compressed air or oxygen, and steam from a steam generator as gasification agents.

II. Description of the Prior Art

The safety valves, which comprise part of the safety apparatus for the gas producers, and the pressure-reducing valves installed in the feed lines to the main and start-up flares have until now been designed for the maximum amount of gas which is produced in the coal pressure gasification unit. Thus, when the safety apparatus is actuated, practically all of the gas which can be produced flows out and must be burned in the flare. This considerably burdens the environment with waste heat gases.

SUMMARY OF THE INVENTION

One object of the invention is to create an apparatus to limit, as much as possible, the quantity of fuel gas fed to the gas flare units.

The invention employs pressure-reducing devices inserted in the feed lines of the gasification agents to the gas producers, which devices keep the operating pressure of the gas producer below the response pressure of the safety valves. In this way, the safety valves on the gas producers are prevented from responding so that gas which was previously burned off at the flare is not even formed in the first place.

In combination with the pressure-reducing valves, the blow-off output of gas to the flare unit can be further reduced by the use of regulating valves installed in the line to the main and start up flare units. The regulating valve for the start-up valve also empties into a line to the main flare. This line leads into the main flare line after (or behind) the main flare regulating valve but prior to a quantity-limiting orifice in the main flare line. The main flare regulating valve is quantitatively larger than the start-up flare regulating valve and is set to an outlet pressure to inlet pressure ratio between 0.9 and 0.95 of the system critical pressure ratio. In addition, the start-up flare regulating valve, although usually quantitatively smaller than the main flare regulating valve, is set at the higher system critical pressure ratio. These two measures of regulating valves and pressure-reducing devices in the feed gas lines, limit environmental pollution.

Preferably, the pressure-reducing devices consist of an adjusting motor for adjusting the swirl impeller of the compressor. For this, in a further development of the invention, an apparatus for opening a blow-off or bleeder valve on the compressor is provided.

Moreover, one safety valve can be provided in each feed line for air or oxygen and for steam.

The last-named measures represent further developments of the principle of the invention. Inserting the pressure-reducing devices in the feed lines for the gasification agents to the gas producers may be additive if necessary or can be provided in one or another embodiment as desired.

BRIEF DESCRIPTION OF THE DRAWING

The invention will be explained in detail in the following on the basis of the drawing where like numerals refer to like characters.

DESCRIPTION OF THE PREFERRED EMBODIMENT

Figure 1:
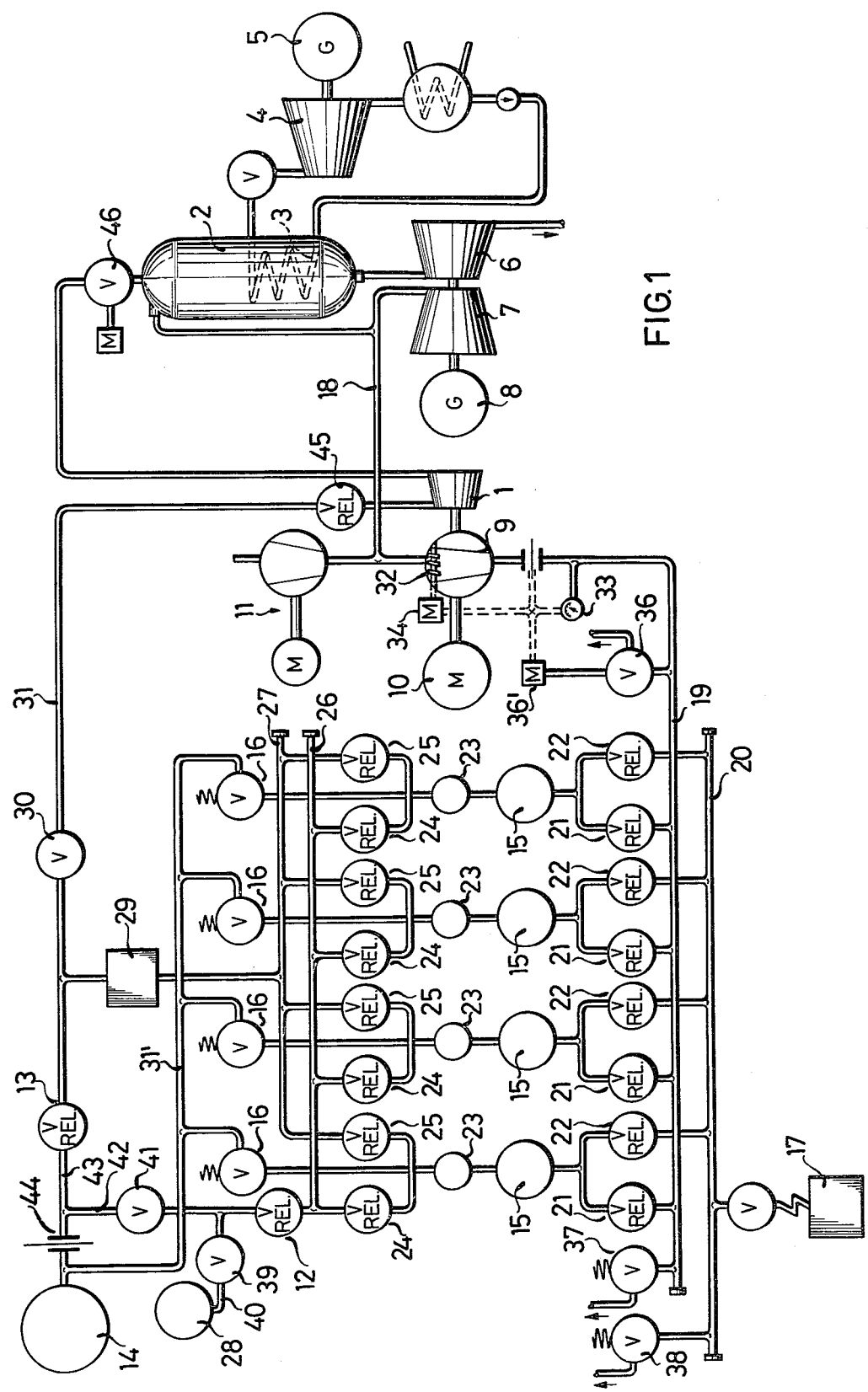
FIG. 1 shows a gas producer unit with a gas safety system and flare unit as well as a gas-steam turbine power plant connected thereto.

The gas produced in the coal pressure gasification unit, explained below in more detail, is, in normal operation, converged by way of an expansion turbine 1 which reduces the pressure of the gas to the operating pressure of the firing equipment of a "pressure-fired" steam generator 2. The gas is burned in this steam generator 2. With the heat produced thereby, high pressure steam is generated in a heat exchanger system 3 which steam drives a steam turbine 4 which is coupled with a generator 5 which serves to generate electric current. The partially cooled power plant gases (flue gases) reach an expansion section 6 of a gas turbine and are there reduced to atmospheric pressure.

The expansion section of this gas turbine 6 drives the gas turbine air compressor 7 which delivers the combustion air required for the combustion chamber of the steam generator 2. The surplus output of the gas turbine 6/7 drives a generator 8 which generates electrical current. Part of the compressed air coming from the compressor 7 is branched off and fed to a second compressor 9, which is also designated as a combustion air compressor. It is driven by the expansion turbine 1 or alternatively, if necessary, by an electric motor 10 which is capable of supplying driving capacity in starting up the unit. If the gas turbine is not in operation and the gas producing unit is to be started up, the necessary starting air, which is only a fraction of the air for combustion at full load operation, is supplied by a start-up air compressor 11 and is brought to the inlet pressure required for the gasification air compressor 9.

The amount of gas produced during starting up and shut down which cannot be used in firing the boiler unit 2 is sent by way of pressure-reducing valves 12 and 13 to gas flare unit 14 and there, after burning, is released into the atmosphere.

The gas flare unit must also safely lead off and burn up the residual amounts of gas produced after any quick shut-off of the whole unit, amounts which are formed in the gas producers 15 by after-reactions. Furthermore, any amounts of gas blown off on the gas producers by the actuation of the safety valve 16 must be conveyed to the flare unit.

The supply system for the gasifying agents for the coal pressure gasification unit consisting of gas producers 15 embraces the air compressors 7, 11 and 9 as well as a steam-generating unit 17, which are connected through pipes 18, 19 and 20 and the control fittings 21, 22 to the gas producers 15. The gas producers 15 are charged with coal. The gas produced is conveyed through a first purification step 23. From this, compressed gas pipes branch off and empty by way of regulating valves 24 and 25 into the start-up gas line 26 or the main gas line 27. A further line empties from each first purification step 23 into the safety valve 16. From the start-up gas line 26, the gas is conveyed by way of the start-up flare regulating valve 12 into either the cold start-up flare 28 or into the main flare 14. From the main gas line 27, the gas flows first through a post-purification step 29 and can then be fed through the slide valve 30 and the line 31 to the consumer in the form of the gas-steam turbine power plant, or flows through the main flare regulating valve 13 into the main flare 14. The blow-off lines 31' from the safety valves 16 are also fed into the main flare 14.

The gas producers 15 needed for producing compressed gas operate under a pressure of 20 to 25 bar in the embodiment example shown. The pressure can, however, assume other values in accordance with the layout of the unit.

The gas produced in the gas producers 15 in normal operation flows to the gas-stream turbine power plant 2, 4, 5, 6, 7 and 8. During the starting phase and during the shut down of the gas producer 15 as well as, for example, in an emergency shut-off of the consumer, the gas produced must be conveyed by way of the pressure-reducing valves 12 and 13 to the flare units 14 and 28. Also, pressure tanks of the gas producers 15 are prevented from exceeding the maximum allowable system pressure by means of safety valves 16.

The safety valves 16, the pressure-reducing valves 12 and 13 and the main flare unit 14 comprise the safety equipment.

This safety equipment is usually designed for the maximum amount of gas which can be produced in the gas-producing unit. When the safety equipment is actuated, therefore, practically 100 percent of the gas which can be produced can and will flow out and must be burned off in the flare, whereby the environment is considerably burdened by waste gases and waste heat.

The invention avoids any actuation of the safety valves 16 without endangering the safety of the unit.

The normal operating pressure of the gas producer 15 including the first gas purification step 23 should be 22 bar in the embodiment example given. The maximum final pressure required for the air for combustion is then 23.5 bar. The compressor 9, driven by the motor 10, is capable of producing a final pressure of over 30 bar with fully opened swirl impellers 32. However, this pressure would cause the safety valves 16, which are set for a minimum response pressure of 30 bar, to be actuated.

(a) In this arrangement, starting from the pressure control point 33 a control impulse is emitted to the servomotor 34 which retracts the setting of the swirl impellers 32 in such a way that a maximum pressure figure, which here is set at 24.5 bar for example, is not exceeded.

(b) If this control of the maximum pressure figure should fail, then through a second measure, if the final compression pressure of 24.5 bar in the embodiment example is exceeded, the blow-off valve 36 can open by the impulse emission from the pressure control point 33 to a servomotor 36'.

(c) Furthermore, if this safety measure, contrary to expectation, should also fail, it is provided in a further development of the invention that the safety valve 37, which in the embodiment example is set at 26 bar, when the combustion air or oxygen line 19 is opened. The safety valve 38 connected to the gasification steam line 20 is similarly set at the same minimum response pressure.

The safety valves 37 and 38 are designed for the maximum amounts of air or steam which can be produced. Since the normal opening pressure difference in the safety valves 37 and 38 often amounts to as much as 10 percent (2.6 bar) of the minimum response pressure, the entire quantity of air or oxygen, and steam are let off at 28.6 bar in the embodiment example shown.

(d) Finally, as another safety measure, when a pre-set maximum figure is reached, the regulating valves 21 and 22 (for the gasifying agents) can be actuated. The corresponding maximum figure is set at 25.5 bar in the embodiment example shown.

Since the minimum response pressure of the safety valves 16 should be 30 bar in the embodiment example shown, any actuation of these safety valves 16 is out of the question due to interruption of the gasification agents supply and so no corresponding quantities of produced gas can flow into the flare unit with the resulting burden on the environment.

Any produced gas which cannot be taken up by the consumer, in the present case the firing of the boiler unit 2, during the start-up and shut-down as well as in case of a quick cut-off of the combined gas-steam turbine unit 6-7-8, 4-5 and of the boiler unit 2, are flared off by way of the gas pressure-reducing valves 12 and 13 and thus through the main flare 14.

Cold Start-up

In order to start the gas producer 15 from the cold state, a small amount of gas which is less than 10 percent of the maximum amount of gas which can be produced must be fed by way of the slide valve 24, the pipe 26, the start-up flare regulating valve 12, the slide valve 39 and the pipe 40 to the cold-start flare 28 or by way of the slide valve 41 and the pipe 42 into the main flare 14. The cold-start flare 28 is used as long as the gas still contains oxygen and must be burned off in special burners. If the gas is almost free of oxygen, the slide valve 41 is opened and the slide valve 39 is closed so that the gas is fed to the main flare 14. If all the gas producers 15 are started up and are all in the same state of pressure, then the oxygen-free gas can also be conveyed through the opened slide valve 25 and through the pipe 27, the second gas purification stage 29, the main flare regulating valve 13, the pipe 43 and an orifice 44 of the main flare 14. If part of the gas producers 15 are in normal operation and the gas is fed through the slide valve 30, the pipe 31 and a regulating valve 45, to the expansion turbine 1 for the firing of the boiler 2, then the gas for the gas producers 15 which are to be started up and which are still at a low pressure level is fed through the slide valve 24, the start-up flare regulating valve 12, the slide valve 41 and the orifice 44 into the main flare 14, until the operating pressure is reached; this gas could also be fed to the firing equipment.

Hot Start-up

If the gas producers 15 are to be started up from a standstill from the hot state, i.e. when they happen to be under the operating pressure and operating temperature so that thereupon, the gas-steam turbine power plant connected after this can be put into operation, then a gas output of about 20 percent must be available for the firing equipment in boiler 2. Since the gas producers 15 cannot abruptly produce this output of 20 percent from a standing start, the gas output must be slowly increased from 0 to 20 percent and first burned through the flare 14. Only at the moment of ignition of the firing equipment of the boiler unit is the gas switched by way of the valve 30, the pipe 31, the valve 45, the gas expansion turbine 1 and the gas quick cut-off valve 46 to the boiler 2 while the main flare regulating valve 13 is simultaneously closed.

Gas must also be flared off in case of a quick shut-off of the entire unit, since chemical post-reactions in the gas producers 15 will still produce a certain residual amount of gas, and, since the firing equipment of the boiler 2 is shut-off by the quick cut-off of the valves 45 and 46, this must be conveyed by way of the main flare regulating valve 13 into the flare 14. This residual amount of gas, in the embodiment example under consideration may briefly amount to 22 percent of the maximum amount of gas which can be produced. Carrying off a larger amount of gas through the main flare regulating valve 13 is not necessary and can generally be eliminated.

The start-up flare regulating valve 12 should be able to pass 10 percent of the maximum amount of gas which can be produced, under the embodiment example described, and the main flare regulating valve 13 up to 22 percent of this, into the main flare 14. Normally, only one flare regulating valve is in operation, so that the maximum amount of flare gas need not exceed the value of 22 percent. However, due to faulty servicing or disturbances in the controls, both flare regulating valves may open at once, so that the sum of gas for both valves can reach the figure of 32 percent.

Design Considerations

In order to limit the capacity of the flare unit to the amount of flare gas occurring during normal operation, the quantity-limiting orifice 44 is installed behind pipes 42 and 43 coming from the start-up flare regulating valve 12 and the main flare regulating valve 13, respectively. The orifice, in combination with the dimensioning of the start-up flare regulating valve 12 and of the main flare regulating valve 13 is so proportioned that when both valves 12 and 13 open, the amount flowing to the flare is at most only one percentage point in excess of the amount of 22 percent occurring in normal operation when only the valve 13 is open. The percentages given are calculated on the maximum amount of gas which can be produced.

Figure 3:
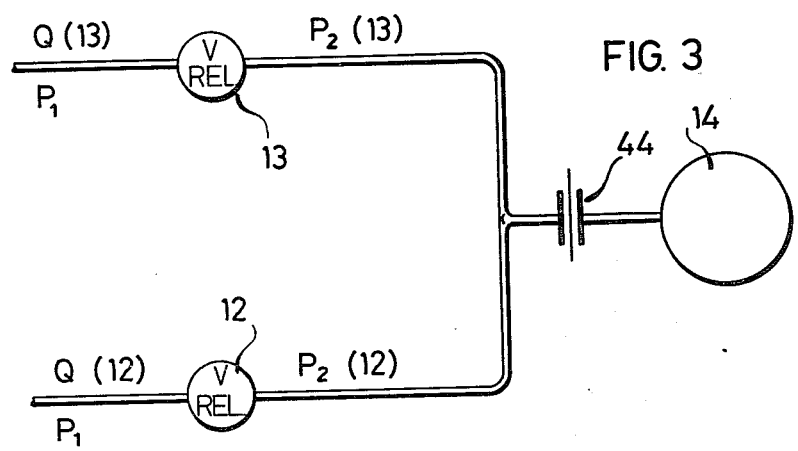
FIG. 3 shows a circuit schematic for the flare regulating valves, the quantity-limiting orifice and the main flare.

The basic diagram of the flare regulating valves 12 and 13 of the quantity-limiting orifice 44, and of the main flare 14 are diagrammatically represented in FIG. 3.

$P_1$ = Inlet pressure, 22 bar in the embodiment example;
13 = Regulating valve 13;
12 = Regulating valve 12;
44 = Quantity-limiting orifice 44;
Q = Throughput;
$P_2$ = Counterpressure or outlet pressure;
$P_{2(13)}$ = Pressure behind valve 13 when only valve 13 is open;
$P_{2(12)}$ = Pressure behind valve 12 when only valve 12 is open;
$P_2'$ = Pressure behind the valve 13 and the valve 12 when both valves are open;
$Q_{(13)}$ = Throughput through the valve 13 when only the valve 13 is open, 22 percent in the embodiment example;
$Q_{(12)}$ = Throughput through the valve 12 when only the valve 12 is open, 10 percent in the embodiment example;
$Q'_{(13)}$ = Throughput through the valve 13 when both valves are open; and
$Q'_{(12)}$ = Throughput through valve 12 when both valves are open.

The pressure behind the orifice 44 is atmospheric.

The size of the flare unit, regulating valves, and orifice 44 to be designed for a given system can be determined by the systems maximum gas production and other constants.

To solve this problem, a general flow equation for calculating the throughputs through one opening was used:

$$Q = P_1 F \mu \sqrt{\frac{2}{RT_1}} \cdot \sqrt{\frac{K}{K-1}\left[\left(\frac{P_2}{P_1}\right)^{2/K} - \left(\frac{P_2}{P_1}\right)\frac{K+1}{K}\right]} \quad (1)$$

In the equation:
Q = Throughput, in Kg/sec;
F = Cross section of opening, m$^2$;
$P_1$ = Inlet pressure ahead of the opening, in bar;
u = Contraction factor of the gas;
R = Gas constant, in J/Kg K;
K = ($c_p/c_v$); and
$P_2$ = Counterpressure, in bar.

For the expression:

$$\sqrt{\frac{K}{K-1}\left[\left(\frac{P_2}{P_1}\right)^{2/K} - \left(\frac{P_2}{P_1}\right)\frac{K+1}{K}\right]} = \psi \quad (2)$$

Figure 2:
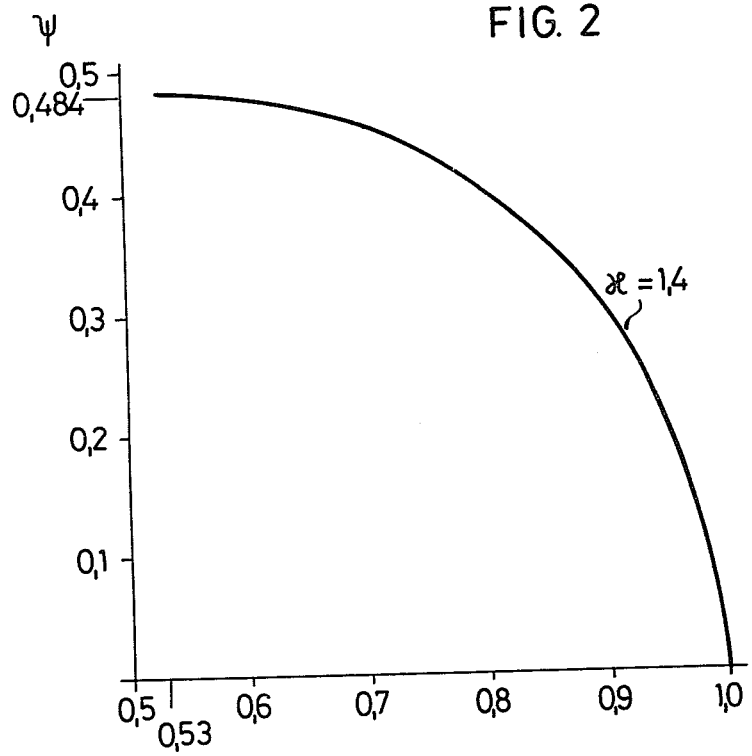
FIG. 2 shows a mathematical curve of the relationships $\psi$ with the pressure ratio $P_2/P_1$.

The curve trend in the following curve according to FIG. 2 applies wherein in this example the K valve for diatomic gases, K=1.4, is inserted. If the gas medium reaches the velocity of sound, the critical pressure ratio is $P_2/P_1 = 0.53$ and the value for $\psi$crit = 0.484. For a lower pressure ratio (pressure ratio above critical) $\psi = \psi$crit = constant, that is, the throughput changes only in proportion to the inlet pressure, as the equation shows:

$$Q = P_1 \cdot F \cdot U \cdot \psi\text{crit} \quad (3)$$

Since F, $\mu$ and $\psi$crit are constant, Q becomes $P_1$ (proportional to $P_1$).

For a consideration of the design, one starts with the regulating valve for the lower throughput, that is with the valve 12, which should have a maximum throughput of 10 percent. This valve 12 is designed for a critical expansion and the inlet pressure $P_1 = 22$ bar in this example and the pressure ratio is 0.53. Thus, one obtains a counterpressure of $P_2$ (12) = 22 bar 0.53 = 11.76 bar.

The quantity-limiting orifice 44 now must be so designed that with a maximum throughput of the valve 12, the pressure before the orifice 44 is less than $P_2$ (12) = 11.76 bar. The second condition for the design of the orifice 44 is that for a maximum throughput through the valve 13 of 22 percent and with valve 12 closed the pressure $P_2$ (13) ahead of the orifice 44 should be about 10 percent below $P_1 = 22$ bar. In the example, $P_2$ (13)=20 bar is chosen. By calculation, the pressure ahead of the orifice 44, where $Q_{(12)}=10$ percent, is:

$$P_{2(12)} = \frac{20 \text{ bar}}{Q_{(13)}} \cdot Q_{(12)} \qquad (4)$$

$$P_{2(12)} = \frac{20 \text{ bar}}{22\%} \cdot 10\% = 9.1 \text{ bar}$$

Therefore, orifice 44 should be designed for this inlet pressure of 9.1 bar with a throughput of 10 percent, thereby also fulfilling the condition that $P_{2(12)}$ should fall below the critical pressure of 11.76 bar for the valve 12.

At the same time, the subcritical counterpressure $P_{2(13)}=20$ bar is prescribed for the design of the valve 13.

$$\text{The pressure ratio } P_{2(13)}/P_1 = \frac{20 \text{ bar}}{20 \text{ bar}} \text{ (see FIG. 2)} \qquad (5)$$

and the corresponding figure for $$\psi = 0.29 \text{ (see FIG. 2)} \qquad (6)$$

It can now be determined what pressure ahead of orifice 44 and what throughputs through the valves 12/13 and the quantity-limiting orifice 44, occur when both regulating valves 13 and 12 are opened. For this calculation, the curve drawn according to Equation (1) is used, since the pressure drop now also proceeds subcritically in valve 12 in any case. The exact values must be determined by the method of successive approximation.

It may be assumed that the maximum throughput $Q'_{(13)}+Q'_{(12)}$ has a value of 22.65 percent due to the quantity-limiting orifice 44.

Therewith, the inlet pressure ahead of the orifice 44 is: (Equation (3) applies, since there is always, by design, a critical pressure drop in the orifice 44)

$$P_2' = \frac{P_{2(13)}}{Q_{(13)}} \cdot (Q_{(13)} + Q_{(12)}) = \frac{20 \text{ bar}}{22\%} \cdot 22.65\% = 20.65 \text{ bar} \qquad (7)$$

$$\text{The pressure ratio } \frac{P_2'}{P_1} = \frac{20.65 \text{ bar}}{22 \text{ bar}} = 0.938 \qquad (8)$$

and the corresponding value for $$\psi' = 0.235 \qquad (9)$$

Therewith, we may determine:

$$Q_{(13)}' = \frac{Q_{(13)}}{\psi} \cdot \psi' \ (\psi \text{ is from Equation (6)}) = \frac{22\%}{0.29} \cdot 0.235 = 17.8\% \qquad (10)$$

$$Q_{(12)}' = \frac{Q_{(12)}}{\psi \text{crit}} \cdot \psi' = \frac{10\%}{0.484} \cdot 0.235 = 4.85\% \qquad (11)$$

The sum of $$Q'_{(13)} + Q'_{(12)} = 22.65\% \qquad 60$$

It is seen that the chosen maximum possible throughput through the quantity-limiting orifice 44 of $Q'_{13}+Q'_{12}=22.65\%$ was chosen correctly (previously determined). In case another value had been found, the calculation would have had to be repeated with corrected values until the chosen and calculated values coincide. By this method of successive approximation, the orifice can be designed to match or exceed the system production.

It is seen moreover that the amount of gas flowing to the flare 14 increases by only 0.65 percentage point if, in an exceptional case, both flare valves 12 and 13 must open.

Therefore, the gas flare need not be designed for the sum of the throughput figures for the two flare valves 12 and 13, but only for 1.06 times the throughput of the larger valve 13.

What I claim is:

1. A gas flare pollution reducing device comprising:
   a coal pressure gasification unit having inlet means and exhaust means, said inlet means for introducing gasification agents into said gasification unit, said exhaust means for emitting product gas formed by combining gasification agents and coal in said gasification unit;
   pressure reducing means, connected to said inlet means of the pressure gasification unit, for reducing the pressure of gasification agents into said gasification unit after an interruption in the operation of said gasification unit;
   a start-up flare regulating valve having an upstream port and a downstream port, said upstream port connected to said exhaust means of said gasification unit;
   a main flare regulating valve having an upstream port and a downstream port, said upstream port connected to said exhaust means of said gasification unit;
   a start-up flare connected to said downstream port of said start-up flare regulating valve for burning product gas from said gasification unit;
   orifice means, connected to said downstream port of said start-up flare regulating valve and to said downstream port of said main flare regulating valve, for limiting the flow of product gas therethrough;
   a main gas flare connected to said orifice means for burning product gas from said gasification unit;
   a first predetermined minimum response pressure, connected to said start-up flare regulating valve at said upstream port, for actuating said start-up flare regulating valve after an interruption in the operation of said gasification unit and when an excess quantity of product gas is formed in said gasification unit, said first predetermined minimum response pressure further being determined by the critical pressure ratio for the product gas across said start-up flare regulating valve; and
   a second predetermined minimum response pressure connected to said main flare regulating valve at said upstream port for actuating said main flare regulating valve after an interruption in the operation of said gasification unit and when an excess quantity of product gas is formed in said gasification unit, said second predetermined minimum response pressure further being determined by at least 90 percent of the critical pressure ratio for the product gas across said main flare regulating valve, whereby when said start-up flare regulating valve and said main flare regulating valve are opened and said pressure reducing means are opened after an interruption in the operation of said gasification unit the product gas is permitted to flow from the gasification unit to said start-up gas flare and to said main gas flare to be burned therein thereby reducing environmental pollution.

2. A gas flare pollution reducing device, as recited in claim 1 wherein said inlet means of said gasification unit comprises:
   an air inlet line; and
   a steam inlet line.

3. A gas flare pollution reducing device as recited in claim 2 wherein said pressure reducing means in said air inlet line further comprises:
   a gas turbine air compressor having swirl impellers to supply air to said air inlet line of said gasification unit; and
   adjusting means, connected to said swirl impellers, for adjusting said swirl impellers so that the air pressure emitted from said gas turbine air compressor is reduced after an interruption in the operation of said gasification unit.

4. A gas flare pollution reducing device as recited in claim 2 wherein said pressure reducing means in said air inlet line further comprises:
   a gas turbine air compressor to supply air to said inlet of said gasification unit; and
   bleeder means, connected to said air compressor for reducing the air pressure emitted from said air compressor after an interruption in the operation of said gasifier unit.

5. A gas flare pollution device as recited in claim 1 wherein said inlet means of said gasification unit comprises:
   an oxygen inlet line; and
   a steam inlet line mounted adjacent to said oxygen inlet line.

* * * * *

UNITED STATES PATENT OFFICE  Page 1 of 2
CERTIFICATE OF CORRECTION

Patent No. 4,231,761               Dated November 4, 1980

Inventor(s) Helmut Meyer - Kahrweg

It is certified that error appears in the above-identified patent and that said Letters Patent are hereby corrected as shown below:

Column 6, line 51, after the word "becomes" insert therefor ---- $\approx$ ----.

Column 7, equation 4, line 7, delete "$P_2(12)$-" and insert therefor ---- $P_2(12) =$ ----.

Column 7, equation 5, delete "$\frac{20 \text{ bar}}{20 \text{ bar}}$" and insert therefor ---- $\frac{20 \text{ bar}}{22 \text{ bar}} = 0.909$ ----.

Column 7, equation 10, delete "$Q_{(13)}$," and insert therefor ---- $Q'(13)$ ----.

UNITED STATES PATENT OFFICE

CERTIFICATE OF CORRECTION

Patent No. 4,231,761  Dated November 4, 1980

Inventor(s) Helmut Meyer - Kahrweg

It is certified that error appears in the above-identified patent and that said Letters Patent are hereby corrected as shown below:

Column 7, equation 11, delete "$Q_{(12)}$," and insert therefor ----$Q'_{(12)}$----.

Signed and Sealed this

Third Day of March 1981

[SEAL]

*Attest:*

RENE D. TEGTMEYER

*Attesting Officer*  *Acting Commissioner of Patents and Trademarks*